United States Patent [19]
Kish

[11] Patent Number: 5,603,019
[45] Date of Patent: Feb. 11, 1997

[54] TAKEOVER TECHNIQUE FOR NETWORKED VIRTUAL FILESYSTEMS

[75] Inventor: William A. Kish, Millerton, N.Y.

[73] Assignee: International Business Machines Corporation, Armonk, N.Y.

[21] Appl. No.: 280,049

[22] Filed: Jul. 25, 1994

[51] Int. Cl.⁶ .................. G06F 12/08; G06F 17/30
[52] U.S. Cl. .............. 395/621; 395/413; 395/444; 395/481; 395/200.12; 364/256.3; 364/962; 364/DIG. 1; 364/DIG. 2
[58] Field of Search .................. 395/425, 575, 395/600, 650, 700, 800, 402, 403, 200.12, 439, 444

[56] References Cited

U.S. PATENT DOCUMENTS

| | | | |
|---|---|---|---|
| 4,914,569 | 4/1990 | Levine et al. | 364/DIG. 1 |
| 5,001,628 | 3/1991 | Johnson et al. | 364/DIG. 1 |
| 5,313,646 | 5/1994 | Hendricks et al. | 395/600 |
| 5,361,349 | 11/1994 | Sugita et al. | 395/600 |
| 5,367,698 | 11/1994 | Webber et al. | 395/800 |
| 5,403,639 | 4/1995 | Belsan et al. | 395/600 |
| 5,463,772 | 10/1995 | Thompson et al. | 395/600 |
| 5,485,579 | 1/1996 | Hitz et al. | 395/200.12 |

Primary Examiner—Thomas G. Black
Assistant Examiner—Hosain T. Alam
Attorney, Agent, or Firm—Richard M. Ludwin

[57] ABSTRACT

A system and method for allowing a distributed, coherent network filesystem to have virtual filesystem instantiations existent on any number of client nodes as well as on the server node that maintains the physical instantiation. On the server node only one image of the filesystem is visible even though two instantiations (physical and virtual) have been realized on that node. The rendering the physical instantation invisible and inaccessible is accomplished by performing a "takeover" of the physical filesystems data structures by the virtual filesystems mounting subroutines.

11 Claims, 4 Drawing Sheets

TAKEOVER TECHNIQUE FOR NETWORKED VIRTUAL FILESYSTEMS

I. BACKGROUND OF THE INVENTION a. Field of the Invention

This invention relates to presenting a consistent cluster image to users of a multicomputer systems having access to shared files. Specifically, this invention relates to systems and methods for insuring that the global view of mounted filesystems is consistent.

b. Related Art

In a general purpose computing system, such as those supporting versions of the Unix operating system, applications may access data stored on disk drives by means of a set of operating system services including a filesystem. A filesystem is a set of files on a disk and the program tools for maintaining the set of files. Filesystems that control the physical representation of objects such as directories and files are known as physical filesystems. A physical filesystem can be thought of as including two parts, the programs that control the physical representation of the files and the files themselves as stored on the disk.

The process of making the files on a disk available to users of the computing system is referred to as "mounting a filesystem". When a filesystem is mounted, the filesystem's control program reads certain information from the disk concerning the layout of filesystem objects. From this information, the filesystem constructs data structures known as "virtual filesystems" or VFS's. Each time a file is opened, or made accessible, the filesystem creates a data structure, referred to as a "vnode", which is chained to the VFS.

Each vnode contains information about a given file and contains pointers to data structures known as "gnodes", "inodes" and "cnodes". The "gnodes", "inodes" and "cnodes" contain information such as the owner of the file, the size of the file, the date and time of the file's creation and the location of the blocks of the file on the disk. When Unix filesystems are mounted, they are generally "mounted over" a "stub" directory that acts as a placeholder and allows a system's filesystem hierarchy to resemble an uninterrupted tree.

In a networking environment, a number of Unix computing systems can be interconnected by way of a communication network and can share files by way of a distributed filesystem. Access to the shared files is coordinated by program modules referred to as the physical filesystem importer and the physical filesystem exporter. The filesystem exporter is typically executed on the server node (the computing system that is attached to the disk containing the filesystem data), while the filesystem importer is typically executed on the client nodes (other nodes that wish to access the files on the disk). Accesses to shared files made by users on the client nodes are referred to as "remote" accesses. Accesses to shared files made by users on the server node are referred to as "local" accesses.

The physical filesystem exporter processes requests for filesystem operations from remote clients. The exporter acts as an interface between the remote clients virtual filesystems and the physical filesystem, performing any physical filesystem manipulation required to process the requests. The physical filesystem importer is the client side interface to the physical filesystem exporter. The importer intercepts requests for filesystem operations on the virtual filesystems and appropriately formats corresponding request messages for processing by the physical filesystem exporter.

In systems utilizing a non cache-coherent remote filesystem, such as NFS, the user-accessible filesystem on the server node is generally the physical filesystem. Direct user accesses to the servers physical filesystem precludes the use of a consistency protocol software layer to ensure cache coherency. Thus, in such systems there is the possibility of an inconsistent filesystem image across the nodes on the network.

In the event that the physical filesystem being exported by a server is imported on the same node by a remote filesystem such as NFS, there are several confusing side effects. One of these side effects is that there is more than one path to access the same set of files (the NFS path and the physical path). These paths have different names and potentially different behaviors. Both filesystems are represented to users and administrators (collectively referred to as users) via the administrative utilities provided to manage filesystems. Having multiple, inconsistent views of the same physical filesystem can be confusing to users and may result in mistakes and loss of data.

II. SUMMARY OF THE INVENTION

In light of the foregoing, the present invention comprises a filesystem takeover technique which includes a sequence of operations whereby a newly mounted virtual filesystem (VFS) captures all new access to an already mounted virtual filesystem. From the users perspective, the new virtual filesystem takes the place of the existing virtual filesystem and transparently routes all of the local user access requests to the existing virtual filesystem.

Advantageously, the present invention can be used to add additional functionality to an existing filesystem. For example a filesystem coherency protocol can be instantiated in the new VFS so as to provide a consistent filesystem image across nodes in a networked computing environment.

III. BRIEF DESCRIPTION OF THE DRAWING

IV. DETAILED DESCRIPTION OF THE PREFERRED EMBODIMENT

Figure 1:
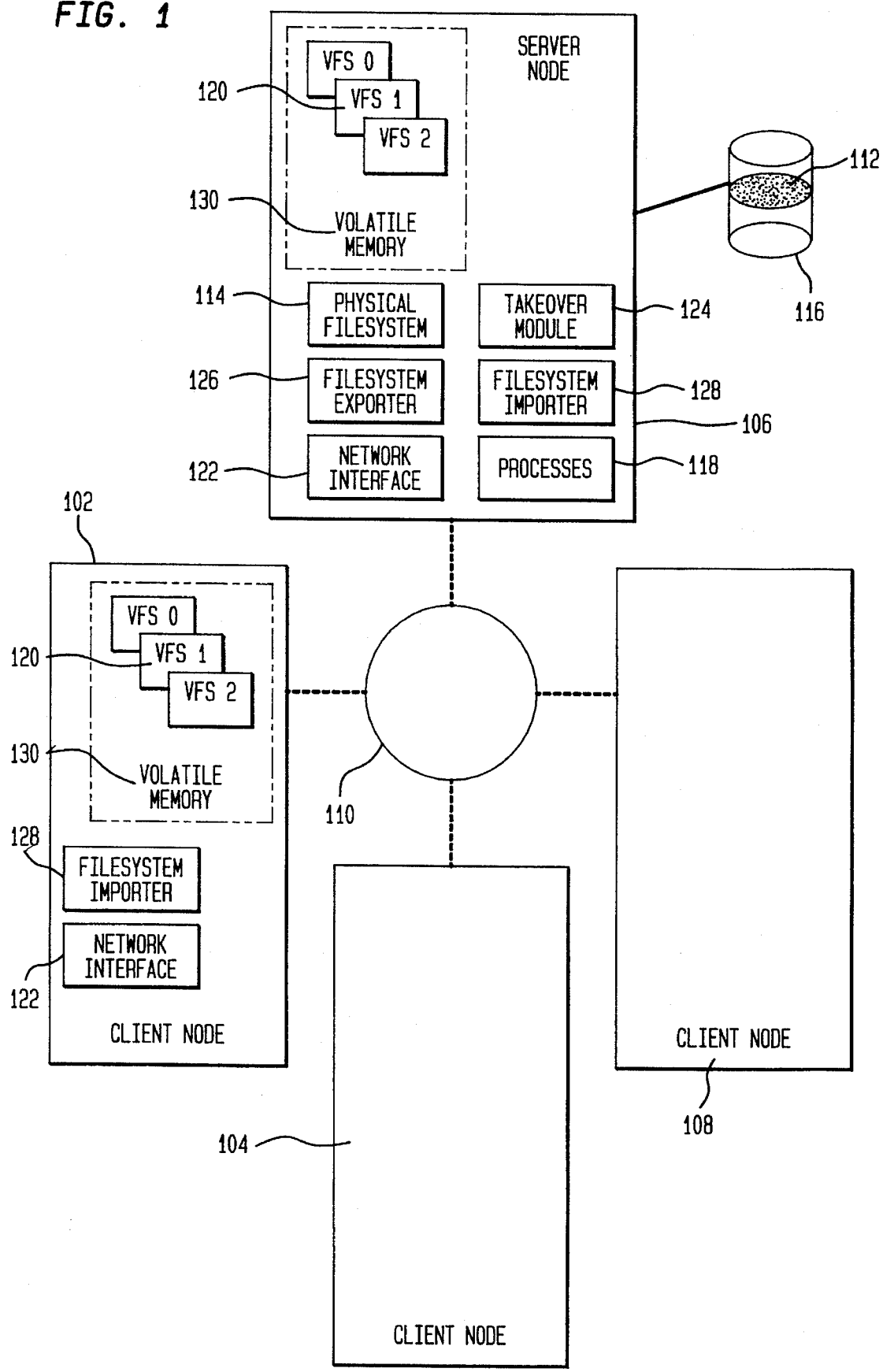
FIG. 1 depicts a networked system suitable for use with the present invention.

The system of the present invention can be embodied in a networked computing system of the type shown in FIG. 1. The system of FIG. 1 includes a number of processing nodes (sometimes referred to as nodes) 102–108 interconnected by way of a communication network 110. One of the nodes 106 acts as a file server for the data 112 (including files and directories) of a particular filesystem 114 stored on disk 116.

Each of the nodes can be running one or more processes 118 which can request access to the shared files and directories 112. The nodes 102–108 can be embodied, for example, on IBM RISC System/6000 machines using AIX 3.2. The communications protocol can be, for example, be either UDP/IP or TCP/IP. The network 110 can be, for example, a token ring.

The server node 106 includes a number of virtual file systems (VFS's) 120, a network interface 122, the physical filesystem 114, a takeover module 124 and a filesystem exporter 126. Each of the client nodes include VFS's 120 (representing the same filesystems as the VFS's on the server node), a network interface 122 and a filesystem importer 128. Each of the above-described blocks runs under control of an operating system (not shown) such as UNIX or AIX. As is known in the art, each of the nodes can be a "server" with respect to filesystems on disks which it controls.

According to an embodiment of the present invention, when a physical filesystem is mounted on the server node, the takeover module 124 is invoked by the mount command. The takeover module instantiates a new VFS on the server node and manipulates the VFS data structures so as to redirect all local user accesses of the physical VFS, to the new VFS. The new VFS is an instance of the VFS type whose operations are handled by the filesystem importer 128.

In order to avoid confusion, the mounted physical filesystem 112 is hidden from users. Instead, each of the nodes views the physical file system through the importer 128 and exporter 126. Thus, on the server node 106 only one filesystem is visible even though there are two filesystems mounted (the physical filesystem and the virtual filesystem representation of the exported physical file system).

The process of hiding the physical filesystem from local users on the server node 106 and making it accessible to the local users only by way of the exporter 126 is referred to as a virtual filesystem "takeover".

Figure 2:
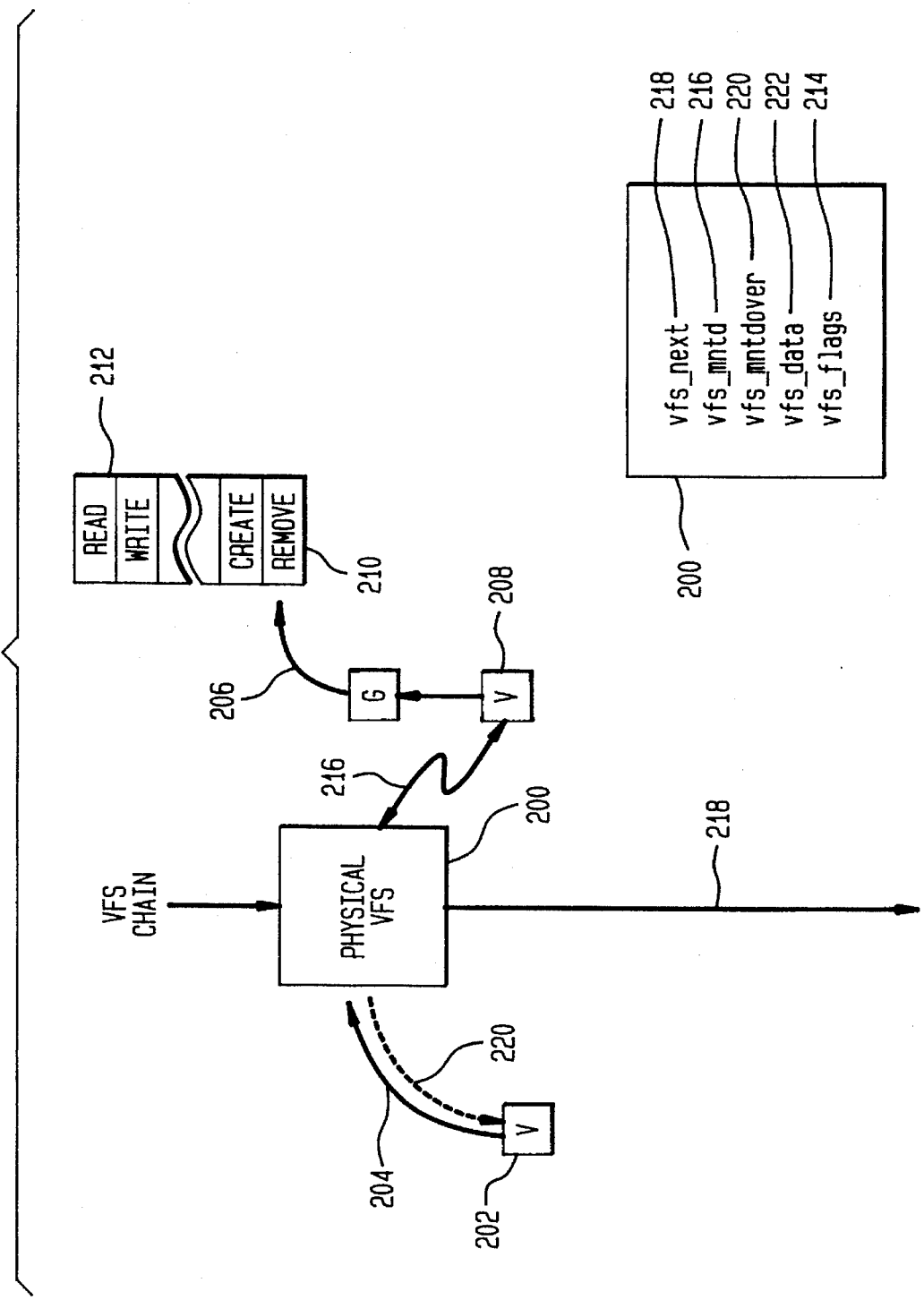
FIG. 2 depicts the state of a newly mounted filesystem BEFORE the takeover operation has commenced.

FIG. 2 depicts the state of a newly mounted filesystem BEFORE a takeover operation has commenced. The VFS 200 (the Physical Filesystem VFS) is the virtual filesystem for the physical filesystem 112 and is one of the VFS's 120 on the server node 106 of FIG. 1. The Physical Virtual Filesystem does not exist on the clients nodes. Each VFS 120 including the Physical Filesystem VFS 200 includes a number of fields. The flags field (vfs__flags) 214 includes a vfs__hidden flag 214(1) which, when set, causes the existence of this VFS not to be reported to the processes 118 by the operating system. The "vfs__next" field 218 points to the next VFS in a chain of VFS's. The "vfs__mntd" field 216 points to (identifies) the root vnode of the virtual filesystem. The "vfs__mntdover" field 220 points to the stub vnode 202 over which the VFS was mounted. The "vfs__data" field 222 describes the implementation specific data about the filesystem such as the name of the disk, the size of the disk and the type of accesses permitted and includes a "tkover__vfs" field which will be described in more detail later.

The Physical Filesystem VFS 200 maintains vnodes (V) and gnodes (G) for files that are open in the virtual File system. In the embodiment of FIG. 2 a stub vnode 202 and a root vnode 208 are shown. The stub vnode 202 includes a "v__mvfsp" field 204 which points to the VFS 200 which has been mounted over this stub. The gnode 210 (and the gnode 310 of FIG. 3) contain pointers 206 to a table of operations 212 that can be performed on files. Each filesystem type implements its own set of operations. These operations are described by a vector of subroutine pointers that is maintained for each filesystem type (e.g. NFS, AFS, UFS, etc.). The gnodes contain pointers 206 to the appropriate vector.

Figure 3:
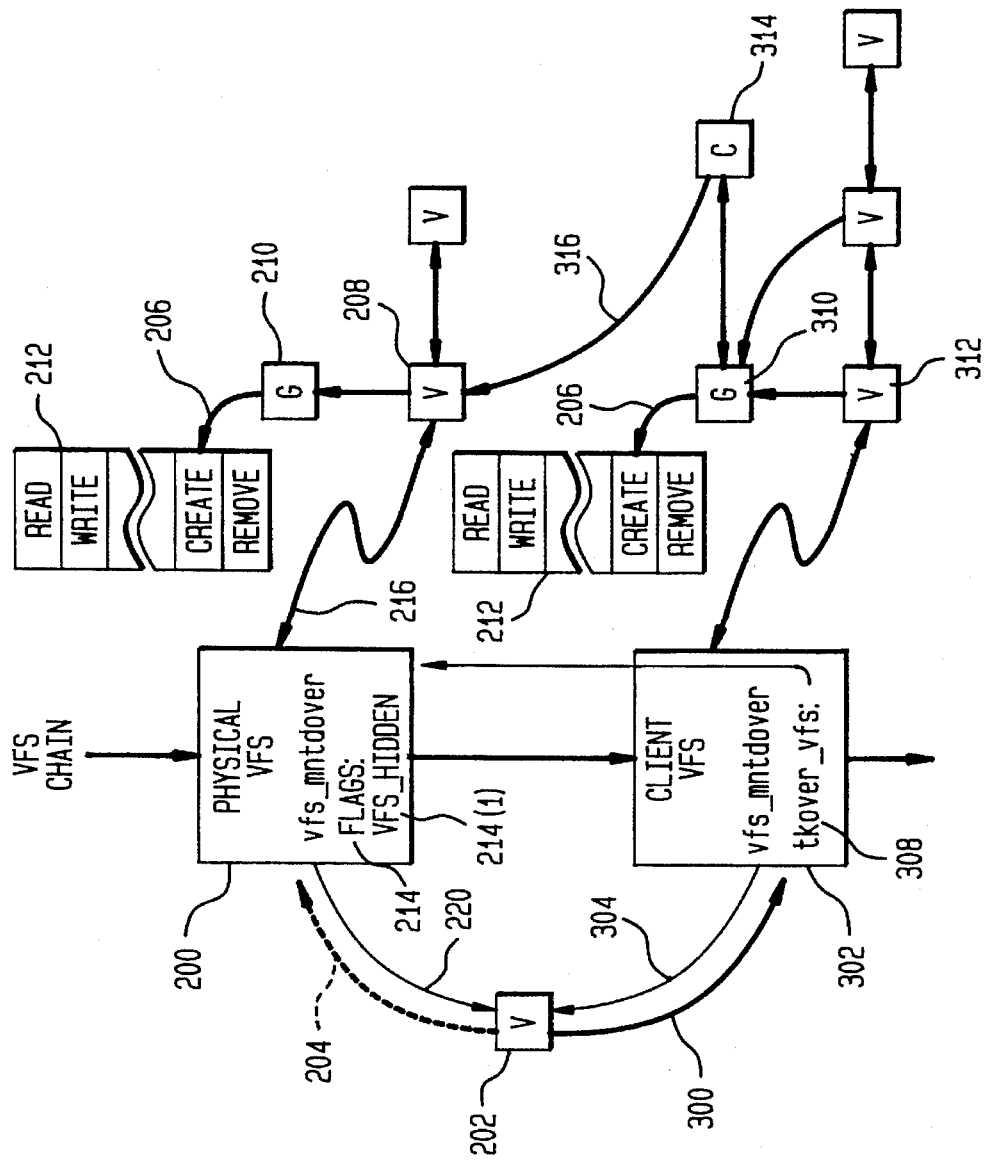
FIG. 3 depicts the state of the same filesystem AFTER the completion of the takeover operation.

FIG. 3 depicts the state of the same filesystem AFTER the completion of the takeover operation. In FIG. 3, each of the pointers is depicted by an arrow between the object containing the pointer and the object to which it points. The VFS which has taken over for the Physical VFS 200 is referred to as the Local Client VFS 302. The Local Client VFS 302 includes the same fields as the Physical VFS. A "tkover__vfs" field 308 identifies the underlying Physical filesystem VFS 200 which is being taken over. (The Physical Filesystem VFS 200 can also contain a tkover__vfs field 308 whose contents are ignored by the control program).

Like the Physical Filesystem VFS 200, the Local Client VFS maintains Vnodes and Gnodes. In addition, the Local Client VFS maintains a cnode 314 which maintains a pointer 316 to the underlying Physical Filesystem root vnode 208. The root vnode 312 of the Local Client VFS 302 contains a pointer to a particular gnode 310 which in turn contains a pointer to the "cnode" 314. The cnode's reference to the underlying Physical Filesystem root vnode can be used to improve performance of those operations which cause the filesystem exporter to reference the file or directory described by this vnode.

Figure 4:
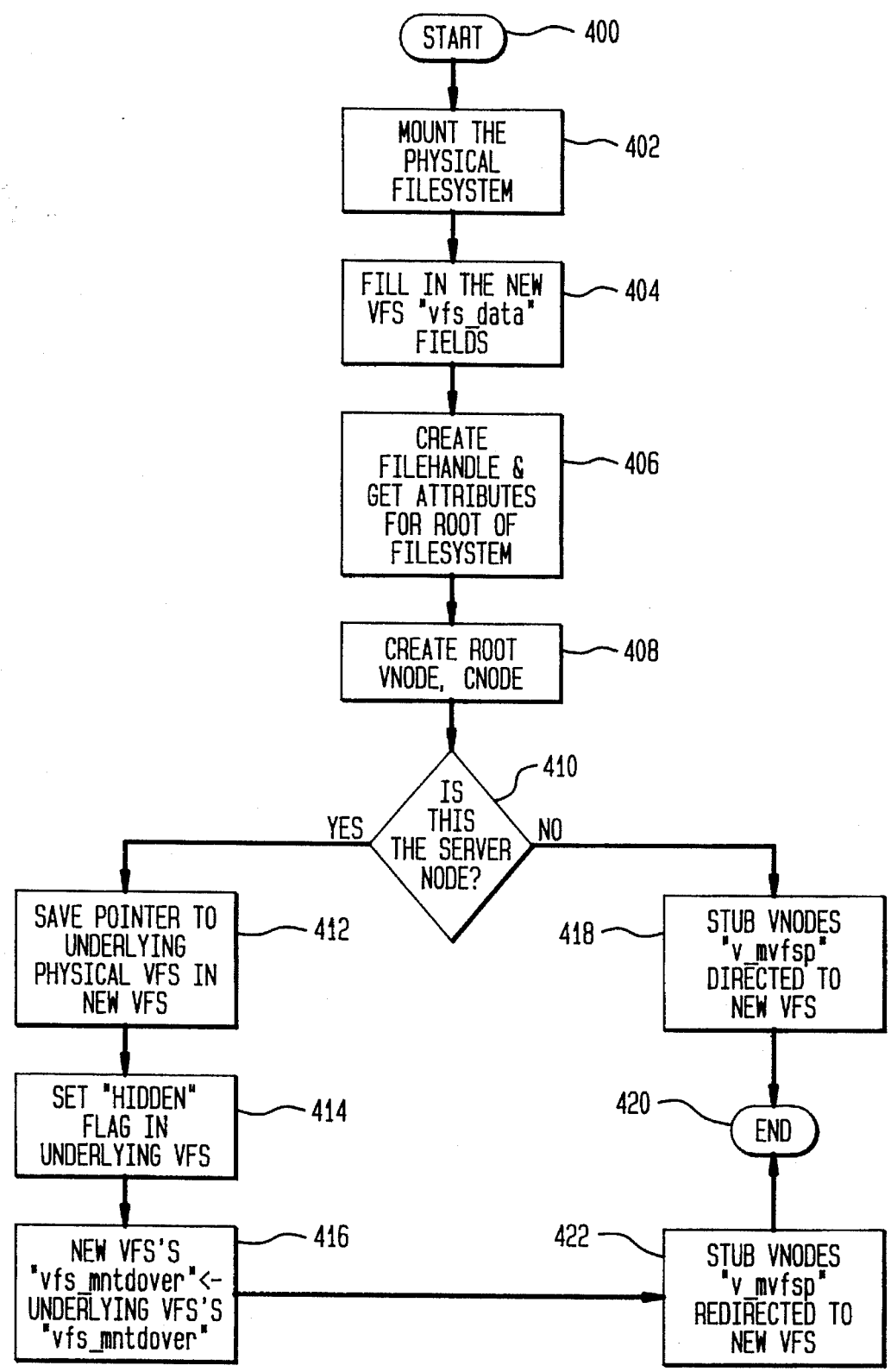
FIG. 4 is a flow chart of the filesystem takeover algorithm.

The operation of the takeover module in performing a takeover of a physical filesystem 112 by a virtual filesystem maintained by the exporter 126 is accomplished as shown in FIG. 4.

In step 400, the takeover is invoked by the system mount command. The takeover commences at the time of mounting the local client virtual filesystem 302 (which becomes one of the VFS's 120) and after filesystem 200 has been successfully mounted. In order to prevent an inconsistent view of the filesystem being taken over, the physical mount of filesystem 200 and the takeover are performed within a "critical section" (i.e. the operating system blocks other processes from executing during the mount and takeover).

In step 402 the physical filesystem is mounted in a conventional manner. After the physical filesystem is mounted, in step 404 the "vfs__data" field 222 in the Local Client VFS structure 302 is filled in by the filesystem exporter 126.

Next, in step 406, the exporter 126 requests the physical filesystem 114 to provide a vnode pointer 208 that identifies the root directory for the filesystem being taken over. This vnode pointer is stored in the root cnode 314 of the Local Client virtual filesystem 302. In step 408, the root cnode and vnode are instantiated in the volatile memory 130 of the system on which the mount command has been invoked.

Next, in step 410, a check is made to determine if the node that the mount/takeover is executing on is the server node for the physical filesystem in question. If not, the takeover is not executed and the mount is concluded in step 418 by setting the v__mvfsp field 204 of the stub vnode 202 to the address of the new VFS structure. The takeover module then exits in step 420.

If the node executing the mount/takeover is the server, in step 412 the address of the physical VFS 200 is saved in the tkover__vfs field 308 so that the underlying physical filesystem VFS may be identified by the taking over filesystem.

In step 414 the flags field 214 of the VFS 200 has the VFS__HIDDEN field set. The setting of this flag that causes this existence of the VFS not to be reported to the processes 118 by the operating system. Then, in step 416, the new VFS's vfs__mntdover field 304 is set to the value that is contained in the vfs__mntdover field 220 of the VFS for the physical filesystem. This causes the new VFS to take the place of the physical VFS in the filesystem tree from the user's perspective.

In step 422, the filesystem exporter sets the v__mvfsp field of the stub vnode 202 (which formerly represented the physical VFS 301) to the new VFS 302. At this point there is no way to access the physical VFS except through the new VFS that maintains the only pointer to the physical VFS. The takeover module then exits in step 420.

Advantageously, the present system can be used to add new functionality to an existing filesystem type. This can be accomplished by providing the Client VFS (the VFS to whom operations are redirected) with software implementing the additional functionality. For example, the present system can be used in conjunction with a filesystem coherency protocol in order to provide a consistent filesystem image across nodes in a networked computing environment. A filesystem coherency protocol is a means for ensuring that changes to the filesystem made on one node are reflected in the VFS's of all other nodes remotely mounting the same filesystem. Such a coherency protocols are implemented in conventional distributed filesystems such as Andrew File System (AFS), Distributed File System (DFS) and the Sprite computing environment.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

I claim:

1. A method for controlling access to a first networked virtual filesystem by local users of a node in a networked computing system, comprising the steps of:
   (a) mounting the first networked virtual filesystem on the node,
   (b) mounting a second networked virtual filesystem on the node;
   (c) subsequent to step (a), preventing direct access to the first networked virtual filesystem by the local users;
   (d) subsequent to step (b), routing all requests for access to the first networked virtual filesystem by the local users to the first networked virtual filesystem by way of the second networked virtual filesystem;
   (e) providing the first networked virtual filesystem with a flag which depending on its state will alternatively cause the first networked virtual filesystem to be or not to be reported to certain processes; and,
   (f) setting the state of the flag to cause the first networked virtual filesystem not to be reported to the certain processes.

2. The method of claim 1 wherein the first networked virtual filesystem is a coupled to a physical filesystem and wherein the first networked virtual filesystem routes the requests to the physical filesystem.

3. The method of claim 2 wherein the node is a server node.

4. The method of claim 3 wherein presence of the physical filesystem is hidden from the local users of the server node.

5. A method for having a new virtual filesystem control access to a previously mounted virtual filesystem of a unix style logical file system, said method comprising the steps of:
   a) replacing mount point pointers of the old virtual filesystem by those of the new virtual file system,
   b) setting the new virtual file system takeover pointer to point to the old virtual file system,
   c) setting a flag in the data structures of the old virtual filesystem to indicate that it should be hidden from certain system calls, and,
   d) setting pointers in the internal data structures of new virtual file system to reference the internal data structures of the old virtual file system.

6. A method for controlling access to a physical filesystem by local clients of a server node in a networked computing system, comprising the steps of:
   (a) mounting a first networked virtual filesystem on the server node, the first networked virtual filesystem being coupled to the physical filesystem;
   (b) mounting a second networked virtual filesystem on the server node;
   (c) subsequent to step (a), preventing direct access to the first networked virtual filesystem by the local clients;
   (d) subsequent to step (b), routing all requests for accesses to the physical filesystem by the local clients to the first networked virtual filesystem by way of the second networked virtual filesystem;
   (e) providing a flag which depending on its state will alternatively cause the first networked virtual filesystem to be or not to be reported to certain processes, and;
   (f) hiding existence of the first networked virtual filesystem from the local clients by setting the state of the flag to cause the first networked virtual filesystem not to be reported to the certain processes.

7. The method of claim 6 comprising the further step of exporting contents of the physical filesystem to other nodes of the networked computing system.

8. The method of claim 6 wherein the requests for accesses by the local clients are directed to the second networked virtual filesystem by manipulating data structures that describe the first networked virtual filesystem and instantiating new data structures that describe the second networked virtual filesystem.

9. The method of claim 6 wherein the first networked virtual filesystem does not include a filesystem coherency protocol and wherein the second virtual networked filesystem includes a filesystem coherency protocol.

10. The system of claim 9 wherein the causing is by means of manipulating the data structures that describe the first networked virtual filesystem and instantiating new data structures that describe the second networked virtual filesystem.

11. A system for controlling accesses to a physical filesystem by local users of a server node in a networked computing system, comprising:
   a physical filesystem mounted on the server node;
   a first networked virtual filesystem mounted on the server node and coupled to the physical filesystem;
   a flag associated with the first virtual filesystem, which depending on its state will cause the first networked virtual filesystem to be or not to be reported to certain processes;
   means for setting the state of the flag to cause the first networked virtual filesystem not to be reported to the certain processes;
   a second networked virtual filesystem mounted on the server node and coupled to the physical filesystem, at least one other node of the computing system having a copy of the second networked virtual filesystem mounted thereon; and,
   means for causing the second networked virtual filesystem to capture all local accesses to the physical filesystem by the first networked virtual filesystem and for exporting the contents of the physical filesystem to other nodes of the networked computing system.

* * * * *